June 26, 1934.  C. J. AXTELL  1,964,553
ELECTRICAL SYSTEM
Filed June 24, 1932
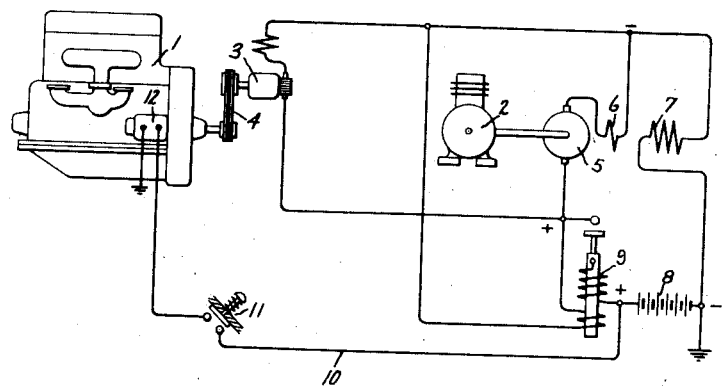
Inventor:
Clinton J. Axtell,
by Charles E. Mullen
His Attorney.

UNITED STATES PATENT OFFICE 1,964,553

ELECTRICAL SYSTEM

Clinton J. Axtell, Erie, Pa., assignor to General Electric Company, a corporation of New York Application June 24, 1932, Serial No. 619,088

2 Claims. (Cl. 172—239)

My invention relates to an electrical system for compensating for the effect of magnetic saturation, and more particularly to such a system when applied to a direct current electric motor which may form one element of a particular electric drive.

In an application of E. G. Merrick, Serial No. 610,368, filed May 10, 1932, and assigned to the assignee of the present application, there is disclosed and broadly claimed an arrangement for compensating for the effect of magnetic saturation in magnetic circuits magnetized by direct current energized magnetizing coils. By compensating for the effect of magnetic saturation I mean compensating for the change in the linear relation between the applied voltage to a circuit for a magnetizing coil and the flux produced in this coil, when saturation of the material of the magnetic circuit occurs. In the above mentioned application, this result is produced by connecting in series with the magnetizing winding a special resistance material having a negative resistance-current or resistance-voltage characteristic. This resistance material has such properties that as the voltage applied to the coil increases the resistance of the material decreases so that the current through the coil can be made to vary disproportionately with the voltage in a manner to produce a flux which is substantially proportional to the voltage regardless of saturation of the magnetic circuit.

In accordance with my invention, I secure substantially the same result by means of a storage battery connected in series with the magnetizing coil. As is well known, storage batteries have a substantially constant voltage and a relatively low internal resistance. When such a battery is connected in series with a magnetizing coil the current through the combination will increase at a greater rate than the voltage applied to the circuit increases and consequently by proper proportioning of the elements this disproportionate increase in current may be made to produce a flux in the magnetic circuit which is substantially proportional to the applied voltage, irrespective of the saturation of the magnetic circuit.

My invention finds particular application to direct current motors, having shunt field windings, which are adapted to be operated at substantially constant speed and which are energized from a source of variable voltage direct current. A particular application of such a motor is to the special electric drive for producing substantially constant speed rotation, for operating a load device, from a widely variable source of primary rotation, which is described and broadly claimed in an application of W. C. Harris, Serial No. 610,393, filed May 10, 1932, and assigned to the assignee of the present application. Broadly speaking, this drive comprises a variable speed driven series wound direct current generator which is connected to operate a shunt wound direct current motor. The motor in turn operates the load device, which is adapted to operate at substantially constant speed. The operation of this system depends upon the distinctive characteristics of these two types of machines and these characteristics interact to produce a desirable resultant effect. Briefly this action is as follows: If the generator speed increases its voltage increases and the increased voltage applied to the shunt motor increases its counter-electromotive force substantially in direct proportion to the increased voltage, provided that there is a linear relation between the voltage and the flux produced by the shunt field winding of the motor. This is true below saturation of the magnetic circuit of the motor, if it is an ordinary motor, and will also hold true above saturation provided that the motor is provided with suitable compensating means, such as I provide. As the counter-electromotive force of the motor changes in substantially direct proportion with changes in the applied voltage, there is substantially no reason for the motor to change its speed. Consequently, as the load on the motor is constant, and as the voltage increases the current must decrease inversely with the voltage so as to maintain substantially constant power input to the motor. This decrease in current must also cause a decrease in the excitation of the series generator and consequently for a given speed range its voltage range will be limited. The result is that over an extremely wide range of speed, for example, a 1 to 5 ratio speed, the voltage of the generator will not increase sufficiently to be objectionable and the speed of the motor will remain substantially constant.

An object of my invention is to provide a new and improved system for compensating for the effect of magnetic saturation.

Another object of my invention is to provide a new and improved electric drive.

My invention will be better understood from the following description taken in connection with the accompanying drawing and its scope will be pointed out in the appended claims.

In the single figure of the accompanying drawing there is illustrated a widely variable speed source of primary rotation, such as an automobile type gasoline engine 1. Operated from engine 1, through an electric drive of the type described and claimed in the above mentioned Harris application, is a load device which is adapted to operate at substantially constant speed, such for example, as a mechanical compressor 2 for an automobile truck type refrigerator. The electric drive comprises a direct current series generator 3 which is driven from engine 1 by any suitable means, such as by a chain and sprocket arrangement 4, and a direct current motor 5 which is preferably a compound wound motor having a relatively small series field winding 6, and a shunt field winding 7. Connected in series with the shunt field winding 7 is a storage battery 8 and the connections of shunt field winding 7 and storage battery 8, across the armature of motor 5, are controlled by an ordinary cutout device 9, such as is employed in all automobile battery charging systems.

The purpose of this cutout is to prevent discharging of the battery 8 and the cutout is arranged only to complete the circuit for the battery when the voltage of generator 3 is greater than the voltage of the battery. The operation of such devices is well known in the art. They consist essentially of a potential winding connected to respond to the voltage of the generator and arranged, when a predetermined voltage is reached, to close the battery circuit. A series current winding acts cumulatively with the potential winding so long as the current flow through the battery is in the proper direction; that is to say, as long as the battery is being charged. As soon as the generator voltage falls below the voltage of the battery, the current in the current coil reverses thereby weakening the effect of the potential coil and causing the cutout 9 to drop out.

A load circuit 10 is connected to battery 8 and this load circuit is controlled by a suitable switch, such for example, as the usual starting switch 11 for an automobile, to cause the circuit 10 to energize a starting motor 12 for engine 1.

Battery 8 may be the ordinary starting, lighting, and ignition battery provided on practically all automobiles or trucks, or it may be an auxiliary battery.

The operation of the above described embodiment of my invention is as follows: Assume that engine 1 has just started and is coming up to speed. This will cause series generator 3 to build up voltage and due to the relatively low resistance of the series field winding 6 and the armature of the motor 5, a relatively heavy current will flow through the series field winding of the motor and the series generator. The purpose of the series field winding is to produce an operating torque for the motor 5 and cause it to turn over and thereby produce sufficient counter-electromotive force to limit the current to a safe value which will prevent the motor from burning out. As soon as the voltage of generator 3 reaches a predetermined value, which value should be greater than the voltage of battery 8, the cutout 9 will close, thereby connecting the shunt field winding 7 and the battery 8 across the motor armature. The series field winding 6 is relatively weak in comparison with the shunt field winding 7 so that as soon as the circuit for the shunt field winding 7 is completed, the motor operates as substantially a shunt motor and the series winding has little effect. As the speed of engine 1 increases the voltage of generator 3 will increase, but due to the fact that the battery 8 has a relatively low internal resistance given changes in voltage across the circuit including the shunt winding 7 and the battery 8 will produce disproportionate increases in current. Consequently, even though the magnetic circuit of the motor 5 should become saturated, the tendency is for the counter-electromotive force of the motor to vary substantially in direct proportion with changes in the voltage of generator 3. The result is that the speed of motor 5 remains substantially constant and as a consequence the current taken by the motor must vary substantially inversely as the applied voltage. Consequently, the generator voltage will not be directly proportional to its speed but will increase at a lower rate than its speed. The result is that over an extremely wide range of speed of engine 1, the motor 5 will operate at substantially constant speed.

For decreases in speed of engine 1 and consequently for decreases in voltage of generator 3, the action is substantially the reverse of the action which has just been described.

By the use of battery 8 the range of satisfactory operation of the system is considerably increased over a range of satisfactory operation with an ordinary compound wound motor. As it is necessary in many installations, such as automobile truck type refrigerators, to have a battery this battery serves the double purpose of increasing the range of operation of the system and also providing energy for starting and lighting. At the same time, the connection of the ordinary battery for an automobile or truck in this manner insures additional charging of the battery, which is of considerable importance in refrigerator trucks which are idling a large percentage of the time.

It should of course be understood that suitable resistances may be connected in series or in parallel with the battery or the motor shunt field so as to modify the characteristics of the motor and also to control the charging rate of the battery.

While I have shown and described a particular embodiment of my invention, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States, is:

1. In combination, a variable speed driven direct current series generator, a direct current motor connected to be energized by said generator, a shunt field winding for said motor, and a storage battery connected in series with said shunt field winding, said battery being connected so as to be charged by the shunt field current.

2. In combination, a variable speed driven direct current series generator, a direct current compound motor connected to be energized by said generator, a mechanical load which is adapted to be operated at substantially constant speed driven by said motor, a storage battery connected in series with the shunt winding of said motor, the voltage of said battery being in opposition to the voltage of said generator, a cutout for preventing the connection of said battery and shunt field winding across the motor armature except when the generator voltage is higher than the voltage of said battery, and a load circuit connected to said battery.

CLINTON J. AXTELL.